Figure 1:
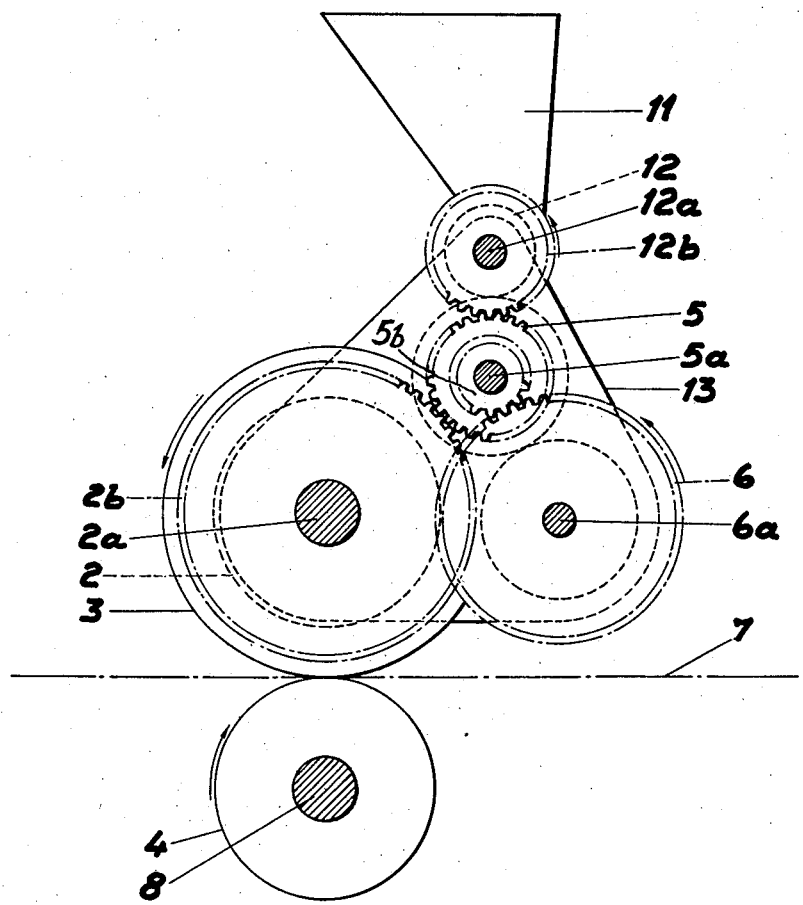

May 18, 1948.    A. B. SVENSSON    2,441,731
MACHINE FOR MAKING CRISP BREAD
Filed Jan. 30, 1945     2 Sheets-Sheet 1

Inventor
A. B. Svensson

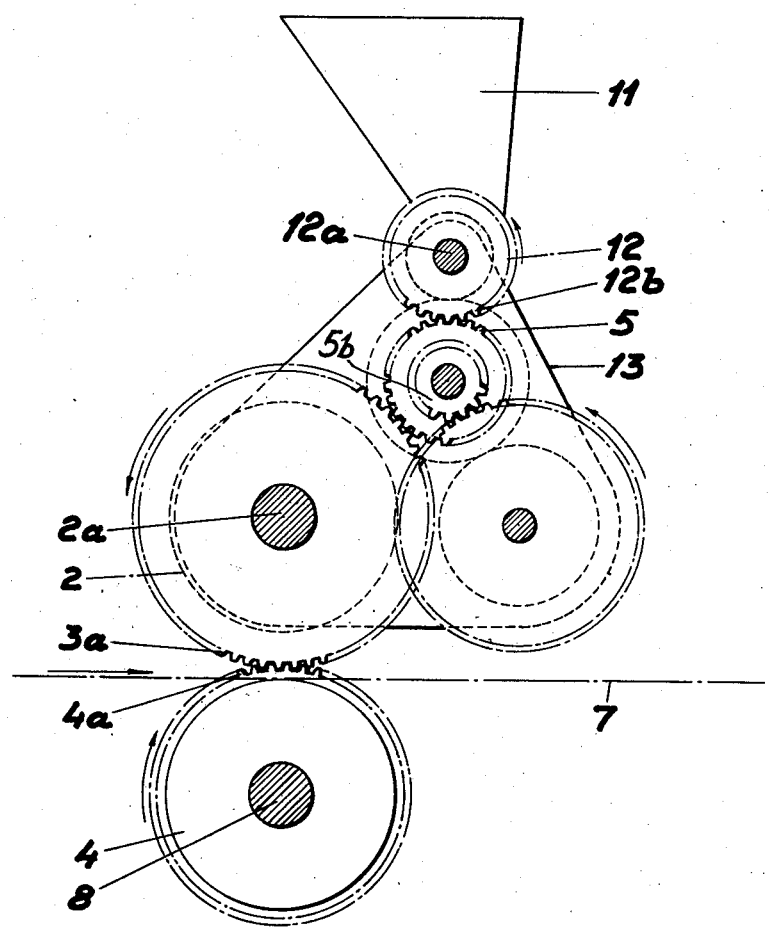

UNITED STATES PATENT OFFICE 2,441,731

MACHINE FOR MAKING CRISP BREAD

Aron Birger Svensson, Filipstad, Sweden

Application January 30, 1945, Serial No. 575,305
In Sweden February 14, 1944

3 Claims. (Cl. 107—8)

The present invention relates to a device in those machines for making crisp bread which have a pricking roll for pricking the unbaked bread, and in which the said pricking roll extends across the dough path. It comprises a roll positioned under and in the vicinity of the pricking roll which supports a cloth carrying the dough string that is driven at the same speed as the rotary speed of the support roll. This roll is connected to the pricking roll by means of gear devices so that the rotary speed of the pricking roll is somewhat less than the speed of the dough string and cloth and also the rotary speed of the support roll.

This device possesses an advantage over known devices of this kind in which the rotary speeds of the support roll and of the pricking roll are equal, in that the pricking pins do not get stuck in the dough string which is moving more rapidly than the pins are rotated. Moreover, the very important advantage is obtained in that the dough patch is held stretched or taut, which has a very advantageous influence upon the fermentation process.

Two embodiments of the device according to the invention are illustrated diagrammatically on the accompanying drawing. Fig. 1 shows the device provided with friction wheels transmitting power between the pricking roll and the support roll. According to Fig. 2 toothed wheels are provided for this purpose.

In the drawings 2 indicates the pricking roll, on the shaft 2a of which there is located a friction disk 3 (according to Fig. 1) resting on the end of a support roll 4. Alternatively a friction disk can also be located on the shaft 8 of the support roll, the said friction disk being frictionally engaged with the friction disk 3. On the shaft 2a there is also located a toothed wheel 2b which is in mesh with a toothed wheel 5 located on a shaft 5a of a cleaning brush for the pricking roll (the brush is not shown in the drawing); a smaller toothed wheel 5b which is also carried by the shaft 5a is in mesh with a toothed wheel 6 which is located on a shaft 6a of a second cleaning brush. The device according to Fig. 1 is driven by the shaft 2a which is actuated by a source of power, for example a motor, not shown in the drawings. The gearing between the pricking roll and the support roll, which has the same speed as the cloth 7 carrying the dough string, is according to the invention of such ratio that the rotary speed of the pricking roll is somewhat less than the rotary speed of the support roll.

According to a modification of the above described device the friction disks for the support roll 4 and the pricking roll 2 may be replaced by toothed wheels 4a and 3a (see Fig. 2). According to the invention the ratio of the gearing between the pricking roll and the support roll, which has the same speed as the cloth 7 carrying the dough string, is such that the rotary speed of the pricking roll is somewhat less than the rotary speed of the support roll. According to this embodiment either the shaft 8 or the shaft 2a may be the driving shaft dependent upon which is connected to a suitable power source. For example, a motor, not shown in the drawings.

In the drawing there is also shown a feed hopper 11 and a portioning roll 12, said portioning roll being carried by a shaft 12a. The latter roll is driven by the toothed wheel 5 which is in mesh with a toothed wheel 12b located on the shaft 12a. A frame 13 carries the shafts 2a, 5a, 6a and 12a. This frame is carried by the base of the device.

Having now described my invention, what I claim as new and desire to secure by Letters Patent is:

1. In a machine for making crisp bread of the type having a dough string supporting cloth, a device comprising at least one pricking roll arranged above and across the dough string for pricking the dough string, a roll positioned under and adjacent to the pricking roll and supporting the cloth carrying the dough string, and motion transmitting means connecting the pricking roll to the supporting roll so that the rotary speed of the pricking roll is less than the rotary speed of the supporting roll and the speed of the cloth and dough string carried thereby.

2. A device according to claim 1 in which the motion transmitting means connecting the pricking roll to the supporting roll include a friction disc mounted on the pricking roll and a friction disc mounted on the supporting roll in frictional engagement therewith, the relative sizes of the discs being such that the rotary speed of the pricking roll is less than that of the supporting roll.

3. A device according to claim 1 in which the motion transmitting means connecting the pricking roll to the supporting roll includes a gear on the pricking roll, and a gear on the supporting roll in mesh with the first gear, the ratio of the gears being such that the rotary speed of the pricking roll is less than the rotary speed of the supporting roll.

ARON BIRGER SVENSSON.